US012704759B2

(12) United States Patent
Pishvaibazargani et al.

(10) Patent No.: US 12,704,759 B2
(45) Date of Patent: Aug. 11, 2026

(54) ASYMMETRICAL SEMICONDUCTOR-BASED OPTICAL MODULATOR

(71) Applicant: Marvell Asia Pte Ltd, Singapore (SG)

(72) Inventors: Hamed Pishvaibazargani, Stittsville (CA); Jie Lin, Cupertino, CA (US); Masaki Kato, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 442 days.

(21) Appl. No.: 18/128,996

(22) Filed: Mar. 30, 2023

(65) Prior Publication Data

US 2023/0314896 A1 Oct. 5, 2023

Related U.S. Application Data

(60) Provisional application No. 63/325,629, filed on Mar. 31, 2022.

(51) Int. Cl.
*G02F 1/21* (2006.01)
*G02F 1/015* (2006.01)
*G02F 1/225* (2006.01)

(52) U.S. Cl.
CPC .............. *G02F 1/212* (2021.01); *G02F 1/015* (2013.01); *G02F 1/225* (2013.01)

(58) Field of Classification Search
CPC ........... G02F 1/212; G02F 1/015; G02F 1/225
See application file for complete search history.

(56) References Cited

U.S. PATENT DOCUMENTS 5,263,102 A * 11/1993 Hakogi .................. G02F 1/225 385/2
8,903,202 B1 * 12/2014 Prosyk .................... G02F 1/225 385/2
9,008,469 B2 * 4/2015 Prosyk .................... G02F 1/225 385/2
9,069,223 B2 * 6/2015 Prosyk .................... G02F 1/225
9,482,925 B2 * 11/2016 Prosyk .................. G02F 1/2255
2013/0209023 A1 * 8/2013 Prosyk .................... G02F 1/011 385/3
2014/0153860 A1 * 6/2014 Prosyk .................... G02F 1/225 385/3
2015/0036965 A1 * 2/2015 Prosyk .................. G02F 1/2255 385/3

(Continued)

OTHER PUBLICATIONS

Robertson et al., Broadband microwave dielectric properties of lithium niobate, Electronics Letters, vol. 27, Issue 2, Rapid Communication, Jan. 1, 1991, https://doi.org/10.1049/el:1991011 (Year: 1991).*

(Continued)

*Primary Examiner* — Peter Radkowski

(57) ABSTRACT

An optical modulator includes a semiconductor substrate and an optical waveguide portion disposed on the semiconductor substrate. A signal contact that extends alongside the optical waveguide portion is disposed on the semiconductor substrate. A first ground line is disposed on the semiconductor substrate spaced away from the signal contact by a first spacing. A second ground line is disposed on the semiconductor substrate spaced away from the signal contact by a second spacing opposite the first ground line. The first spacing is different from the second spacing.

15 Claims, 7 Drawing Sheets

(56) References Cited

U.S. PATENT DOCUMENTS

2021/0373364 A1* 12/2021 Zhang .................. G02F 1/2257

OTHER PUBLICATIONS

Shin et al., Conductor Loss of Capacitively Loaded Slow Wave Electrodes for High-Speed Photonic Devices, in Journal of Lightwave Technology, vol. 29, No. 1, pp. 48-52, Jan. 1, 2011, doi: 10.1109/JLT.2010.2091624 (Year: 2011).*

Patel et al., Design, analysis, and transmission system performance of a 41 GHz silicon photonic modulator. Opt Express. Jun. 1, 2015;23(11):14263-87. doi: 10.1364/OE.23.014263. PMID: 26072793. (Year: 2015).*

Ali-Abadi et al., Design of Dual-band Impedance Matching Circuit Using T-shape Shunt Stub. (2019). (Year: 2019).*

Honardoost et al., Towards subterahertz bandwidth ultracompact lithium niobate electrooptic modulators, Opt. Express 27, 6495-6501 (2019) (Year: 2019).*

Wang et al., Nanophotonic lithium niobate electro-optic modulators, Opt. Express 26, 1547-1555 (2018) (Year: 2018).*

International Search Report and Written Opinion for PCT/US2023/016991, mailed Jun. 22, 2023. (14 pages).

Patel et al., "Design, analysis, and transmission system performance of a 41 GHz silicone photonic modulator," McGill University, Jun. 2015 (25 pages).

Peterson, "A Guide to Mode Conversion, Its Causes, and Solutions," available at https://web.archive.org/web/20220131183729/https://resources.altium.com/p/guide-mode-conversion-its-causes-and-solutions, Apr. 2023 (7 pages).

* cited by examiner

ASYMMETRICAL SEMICONDUCTOR-BASED OPTICAL MODULATOR

PRIORITY

This application claims the benefit of U.S. provisional application entitled "ASYMMETRIC SIGNAL-GROUND GAP IN ASYMMETRICALLY LOADED GSGSG MACH-ZEHNDER MODULATOR," filed Mar. 31, 2022, and assigned Ser. No. 63/325,629, the entire disclosure of which is hereby expressly incorporated by reference.

BACKGROUND

Technical Field

The disclosure relates generally to optical modulators, and more particularly to semiconductor based optical modulators.

Brief Description of Related Technology

During this time of growth of Internet technologies and usage, demand for high speed data transmission has increased rapidly. As an example, average internet traffic in 2022 was estimated to exceed 900 terabits per second. Technologies to support such sustained usage levels will continue to proliferate. Optical transmission of data can support vast amounts of data per channel—often limited more by the rate at which electronics can encode a signal onto the optical channel rather than the bandwidth capacity of the optical channel itself. Because optical modulators are constrained by their electrical-domain systems, increases to electrical-domain modulation bandwidth translate directly into increased total system bandwidth. Thus, increasing optical modulator performance helps meet the growing bandwidth appetite of the global community.

SUMMARY

Figure 1:
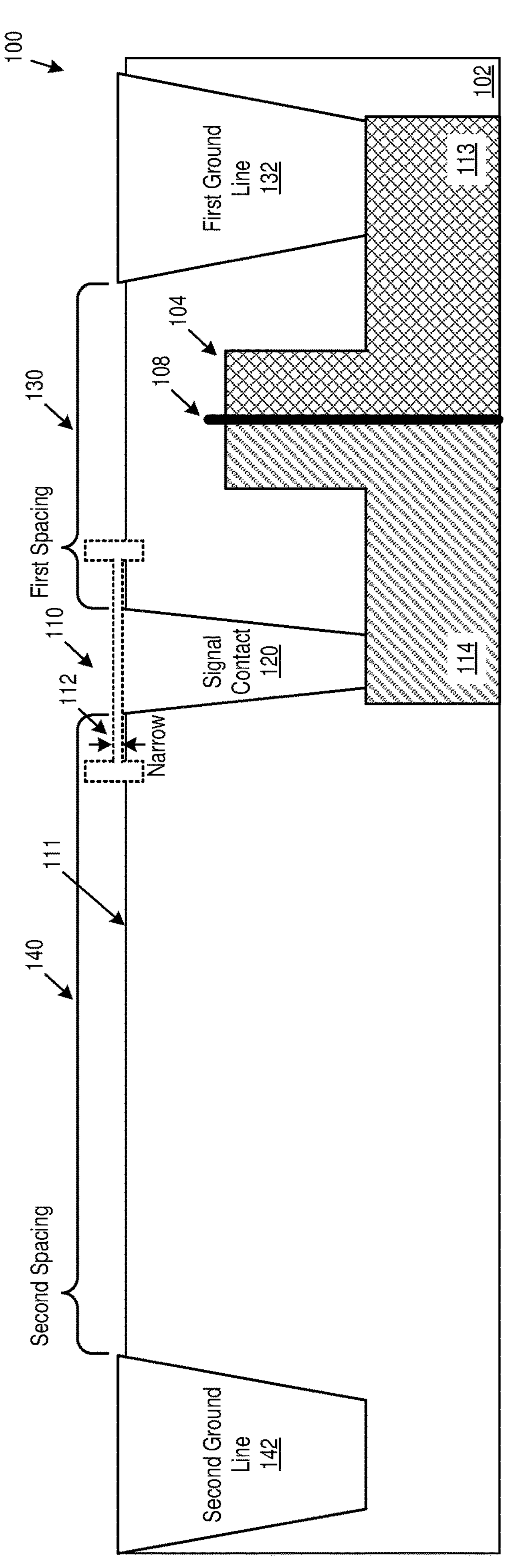
FIG. 1 shows an example asymmetric opposing ground line modulator, in accordance with the present disclosure.

In an implementation, an optical modulator includes: a semiconductor substrate; an optical waveguide portion disposed on the semiconductor substrate, the optical waveguide portion configured to provide an optical path for light that is to be modulated; a signal contact disposed on the semiconductor substrate, the signal contact extending alongside the optical path; a first ground line disposed on the semiconductor substrate and spaced a first distance away from the signal contact, the optical waveguide portion disposed between the signal contact and the first ground line; and a second ground line disposed on the semiconductor substrate spaced a second distance away from the signal contact, the first distance different from the second distance, the signal contact disposed between the optical waveguide portion and the second ground line.

In an implementation, an optical modulator includes a semiconductor substrate; an optical waveguide portion disposed on the semiconductor substrate, the optical waveguide portion configured to provide an optical path for light that is to be modulated; a signal contact disposed on the semiconductor substrate alongside the optical waveguide portion; a first ground line disposed on the semiconductor substrate spaced a first distance away from the signal contact; and a second ground line disposed on the semiconductor substrate, opposite the first ground line, a second distance away from the signal contact, the first distance different from the second distance, the second distance selected to match respective wave velocities of an electrical-domain signal provided to the signal contact and the light that is to be modulated on the optical path.

In an implementation, a method includes optically coupling light to be modulated onto an optical path provided by an optical waveguide portion disposed on a semiconductor substrate; and matching respective wave velocities of light on the optical path and of an electrical domain signal travelling within a signal contact alongside the optical path by: electrically coupling the electrical domain signal across a first spacing from the signal contact disposed on the semiconductor substrate to a first ground line disposed on the semiconductor substrate, the signal contact extending parallel to the optical path, the first spacing extending a first distance; and electrically coupling the electrical domain signal across a second spacing from the signal contact to a second ground line disposed on the semiconductor substrate, the second spacing extending a second distance away from the signal contact opposite the first spacing, the first distance different from the second distance.

DETAILED DESCRIPTION

In various contexts, optical modulators encode electromagnetic modulation signals onto light signals. In some cases, one or more radio-frequency (RF) signals, e.g., potentially aggregated from multiple sources, provide the to-be encoded modulation signals. An optical modulator receives the RF signals and unencoded light as inputs and produces light with the RF signal encoded thereon as an output. An example of a type of an optical modulator is an optical modulator that splits coherent source light in two portions, selectively phase shifts at least one of the portions by a desired phase shift in accordance with the RF signal to be encoded, and then recombines the portions to create an interference effect that encodes the RF signal into the intensity profile of the output light. Ring modulators, which impart the phase shift in a ring coupled to an input/output channel, are one example. Another example is a Mach-Zehnder modulator (MZM) that splits input light into two arms and then recombines the light after phase shifting light passing through (at least) one of the arms.

In various example semiconductor-based systems (irrespective of ring modulator and MZM formats), the phase shift is imparted by passing light through an optical waveguide coincident with a P-N junction that extends along the optical path of the optical waveguide. The RF signal is electrically coupled across the P-N junction, e.g., from an input contact to a DC reference point, to impart the phase shift on the passing light. In some cases, the bandwidth capacity of such semiconductor-based modulators is dependent on the electrical performance of the semiconductor device, e.g., the ability of the device to handle high frequency, 1-100 gigahertz or higher frequency, RF signals. In some cases, factors such as resistivity and/or capacitance over an electrical path cause frequency-dependent losses over the electrical path. In some cases, those losses increase with the frequency of the signal.

In an illustrative example, an optical modulator has travelling-wave electrical contacts. As opposed to lump or spot contacts, a travelling-wave signal contact extends alongside the optical path of the optical waveguide portion of the optical modulator to allow the electrical domain signal to travel in parallel to the light being modulated. Thus, for example in an example MZM with straight optical waveguides, both the optical waveguide and the travelling-wave signal contact are shaped like long rods and are parallel to one another. In various implementations, the travelling-wave signal contact is flanked on both sides by ground lines (e.g., held at ground or another DC reference voltage). In some implementations, the ground lines include extended lines that run along the length the travelling-wave signal contact. In other implementations, the ground lines include a series of discrete shorter lines (e.g., lump contacts or other shorter lines) running along the length of the signal contact. The first ground line is spaced a first distance away from the travelling-wave signal contact. The optical waveguide portion is disposed between the first ground line and the travelling-wave signal contact. The second ground line is present alongside the travelling-wave signal contact opposite the first ground line to form an opposing ground line configuration. The second ground line is spaced a second distance away from the travelling-wave signal contact.

In various implementations, the optical waveguide portion includes a P-N junction on the electrical route between the travelling-wave signal contact and the first ground line. The P-N junction defines a border between a N-doped portion and a P-doped portion. In other words, a P-N junction defines a border between opposingly-doped portions. The optical waveguide portion is structured to guide light in one or more optical modes on an optical path. The P-N junction is on the optical path. Because the signal contact extends along the optical path and the ground lines are alongside the signal contact, the electrical route between the signal contact and the first ground line is transverse to the optical path and transverse to the direction of travel along the electrical path created by the travelling-wave signal contact.

The electrical route between signal contact and the first ground line is distinct from the travel of the electrical domain signal along the signal contact. The electrical path formed by the signal contact itself (e.g., along its extended length parallel to the optical path) allows electrical-domain signal travel parallel to the optical path (e.g., along the extent of the signal contact).

When the P-doped region and the N-doped region are exposed to an electrical potential along the electrical route between the signal contact and the first ground line, an intrinsic region forms at the boundary of P-doped and N-doped regions due to the movement of carriers along this boundary. Due to the plasma-dispersion effect, changing the carrier population changes the refractive index of the intrinsic region. The optical waveguide overlaps with the intrinsic region. Thus, the refractive index within optical waveguide changes. Changing the refractive index of the optical waveguide changes the dispersion properties of the waveguide. Changing the dispersion properties of a waveguide over time causes an effective phase shift in the guided light in the waveguide over time. The formation of the intrinsic region is controlled by the electrical potential along the electrical route. Further, inputting an RF signal on a signal contact causes a changing electrical potential along the electrical route. Therefore, the resultant phase shift for the optical mode is dependent on that RF signal. When recombined and interfered with the other split coherent light, the time-dependent intensity of the interfered modulated output light depends on the time-dependent intensity of the E-field of the RF-signal.

In the opposing ground line configuration discussed above, differences between the first distance and second distance between the ground lines and the travelling-wave signal contact contribute to differential mode to common mode conversion of the electrical domain signal. Because the differential mode of the electrical domain signal is the portion of the signal used to cause the phase shift needed for modulation, differential mode to common mode conversion removes useful power from the electrical domain signal, because the common mode signal reduces the modulation effect and noise component with regard to the modulation). Further, common mode noise is known to lead to radiative electromagnetic interference that may cause an RF device to fail. The problem of differential mode to common mode conversion is well known. Because of this well-known problem, conventional wisdom holds that the first distance and the second distance between respective ground lines and the signal contact should be equal. In other words, differences between these distances should be avoided according to the conventional wisdom.

In modulators where the electrical domain signal travels along a signal contact that is parallel to the optical path, the matching the wave velocities of the electrical domain signal travelling on the signal contact and optical domain signal travelling on the optical path increases the modulation performance of the modulator. Wave velocity matching prevents the electrical-domain signal and optical-domain signal from traveling at different velocities. Keeping the wave velocities of the optical domain signal and electrical domain signal the same ensures that the electrical domain signal have the longest possible length of synchronized interaction over the length of the modulator. In other words, when the wave velocities are matched, the optical domain signal and electrical domain signal travel at the same speed and in parallel to each other. In various implementations, the phase velocity of the electrical domain signal is matched to the group velocity of the optical domain signals. In various implementations, wave velocity matching is achieved by matching the electrical-domain refractive index (e.g., over the frequency range of the electrical domain signal) of the signal contact to the optical-domain group index of the optical waveguide portion for optical domain signals.

In various contexts, matching the electrical-domain refractive index of the signal contact to the optical-domain group index of the optical waveguide portion relies on increasing the material index of the signal contact. Increasing the electrical-domain refractive index of the signal contact relies on increasing the impedance of the signal contact.

Various existing systems reduce the cross-sectional area of the signal contact. This reduction increases the impedance of the signal contact by reducing the conductance of the signal contact. However, in some cases, reducing the cross-sectional area of the signal contact alone is insufficient to achieve impedance values necessary to achieve wave velocity matching with the optical domain signals.

Accordingly, existing systems typically use a "slow-wave" design in which multiple T-shaped branches extend outward from the top of the signal contact. The T-shaped branches of the slow-wave design provide capacitive loading resulting in the target change in impedance (e.g., complex impedance from capacitive contributions) for the signal contact. In some implementations, the slow-wave design is readily and optionally combined with architectures and techniques described herein. Specifically, a signal contact (consistent with the various implementations discussed below) optionally includes a T-shaped branch to provide capacitive loading for impedance control. FIG. 1 shows an example asymmetric opposing ground line modulator 100 with a signal contact 120 with an optional T-shaped branch 110. For clarity of view, the T-shaped branch 110 is shown in the plane of the cross-sectional view. However, the T-shaped branch 110 is disposed flat on top of the signal contact 120 on the top surface 111 perpendicular to the view as shown (indicated by the dotted line). The signal contact 120 is disposed on a semiconductor substrate 102 between first ground line 132 and second ground line 142 at first spacing 130 and second spacing 140, respectively. In an implementation, the first spacing 130 has a length that is different from second spacing 140. An optical waveguide portion 104 is disposed between signal contact 120 and the first ground line 132 The asymmetric opposing ground line configuration is discussed in detail below. In the example modulator 100, the P-N junction 108 is aligned through the middle of the optical waveguide 104. The P-N junction 108 defines a border between the P-doped portion 112 on the substrate 102 and an N-doped portion 114 on the substrate 102.

The example asymmetric opposing ground line modulator 100 of FIG. 1 illustrates how the slow-wave design is combined with the architectures and techniques discussed herein. The combination of the asymmetric opposing ground line structure and the slow-wave design allows for relaxation of the slow-wave design requirements because some of the desired impedance is provided by the asymmetric opposing ground line structure. Thus, combined asymmetric opposing ground line structure and the slow-wave designs increase the robustness of slow-wave optical modulator relative to modulators that rely solely on the slow-wave design.

The slow-wave design relies on the narrowness of the arm 112 of the T-shaped branch 110 to provide the capacitive loading. The narrowness of the arm 112 extending outward from the top of the signal contact 120 reduces the robustness of the modulator because of inherent structural instability resulting from the narrow arm 112. The narrow arm 112, in some cases, causes chip decapsulation and/or other device failures. Thus, due to the need to balance the robustness of the modulator against wave velocity matching requirements, so-called slow-wave designs have been both complex to develop and complex to implement. Accordingly, existing systems have not relied solely on slow-wave designs unless impedance matching requirements can be met, at least in part, through other less complex and more robust architectures and techniques. Further, if other less complex and more robust architectures and techniques existed and were fully appreciated, slow-wave designs would have been developed, at most, as a companion architecture to the less complex and more robust architectures and techniques. Because such slow-wave designs become more increasingly complex to implement as the size of the capacitive effect needed increases, less complex and more robust architectures and techniques would be implemented first to reduce the overall complexity of the device. Thus, the existence of and wide-spread adoption of solely slow-wave designs in traveling wave modulators shows that other less complex and more robust architectures and techniques are not known and are not fully appreciated.

The architectures and techniques described herein proceed contrary to conventional wisdom by using an asymmetric opposing ground line configuration. In the asymmetric opposing ground line configuration discussed herein, the first distance between the signal contact and the first ground line is different from the second distance between the signal contact and the second ground line. As discussed above because of noise effects created by differential-to-common mode conversion, this asymmetric configuration is contrary to conventional wisdom which instead requires that these distances be equal. Moreover, despite the expectations of the conventional wisdom, modelling performed by the inventors has shown that the effects of differential-to-common mode conversion do not appear to cause significant losses within the device.

Figure 2:
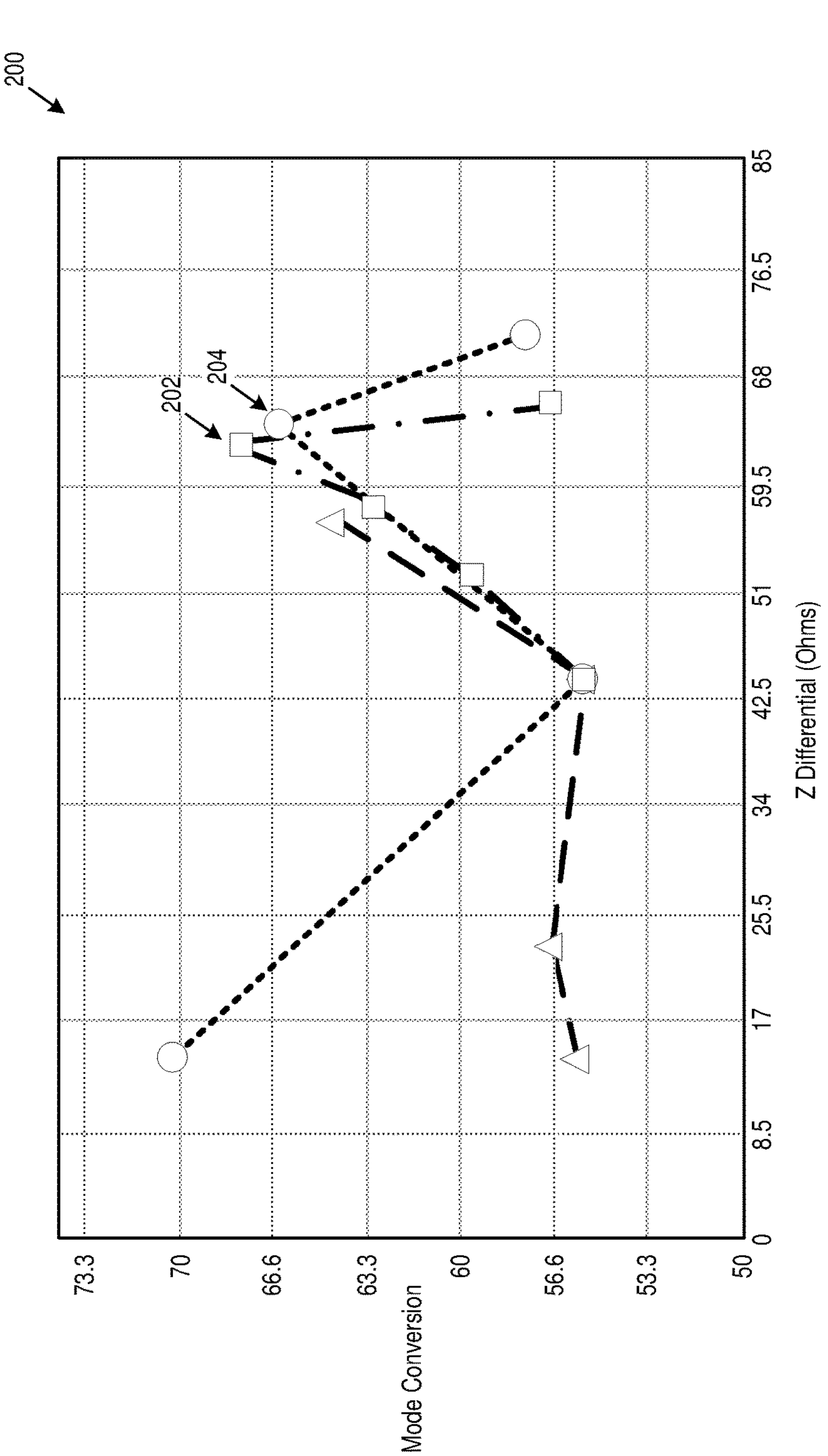
FIG. 2 shows an example plot of modelled differential-to-common mode conversion for the example asymmetric opposing ground line modulator, in accordance with the present disclosure.

Referring now to FIG. 2, an example plot 200 of modelled differential-to-common mode conversion for an example asymmetric opposing ground line modulator is seen. In the plot 200, the modelling shows that the effect 202 of differential-to-common mode for the example asymmetric opposing ground line modulator nearly consistent with such conversion 204 in symmetric systems. The difference between common mode conversion in the example asymmetric opposing ground line modulator and the example symmetric opposing ground line modulator is small enough that it would not be measurable in an actual system due to other noise present in the modulator Although the modelling confirms that the mode conversion effect predicted by the conventional wisdom does occur, the modelling presented in FIG. 2 herein also shows that the conventional wisdom led to undue avoidance of difference between the first spacing and second spacing in opposing ground line modulator designs because the actual modelled difference in performance between asymmetric ground line configurations and symmetric ground configurations is so small that it cannot be measured in actual modulator systems.

Differences between the first distance and second distance allow for control of both confinement of the electrical domain signal (e.g., in the plane transverse to the length of the signal contact) and control of impedance experienced by the electrical domain signal as it travels along the length of the extended signal contact. Thus, by allowing for differing first distance and second distance, modulators have confinement benefits from the opposing ground line design while being able to adjust the spacing between the second ground line and the signal contact (e.g., while maintaining confinement). The additional free parameter of the second ground line spacing is used to control the impedance for electrical domain signals traveling along the signal contact, in some implementations.

The asymmetric opposing ground line configuration provides an optical modulator structure that is more robust and less complex than existing solutions, such as slow wave solutions. For example, asymmetric opposing ground structure does not contribute to the likelihood of device failure due to decapsulation because the asymmetric opposing ground structure lacks any narrow metal contact shapes. The contact structure of the asymmetric opposing ground line configuration are also less complex than those of the slow-wave design because the narrow arm 112 of the T-shaped branch 110 may be omitted. Therefore, the contacts may be formed in a single material deposition step, or using other suitable simplified (compared to slow-wave) deposition techniques. Thus, fabrication of asymmetric opposing ground line configurations is achieved in fewer steps than fabrication of slow-wave devices. Because the asymmetric opposing ground line configuration allows for cheaper fabrication (e.g., through reduction of fabrication steps) and increased device fabrication yields (e.g., through reduced failures) the architectures and techniques described herein reduce modulator production costs without modulator performance reduction, which increases commercial success compared to existing solutions. Thus, there is a *nexus* between the use of architectures and techniques described herein and the increased commercial success of the optical modulator devices that implement the architectures and techniques described herein.

Figure 3:
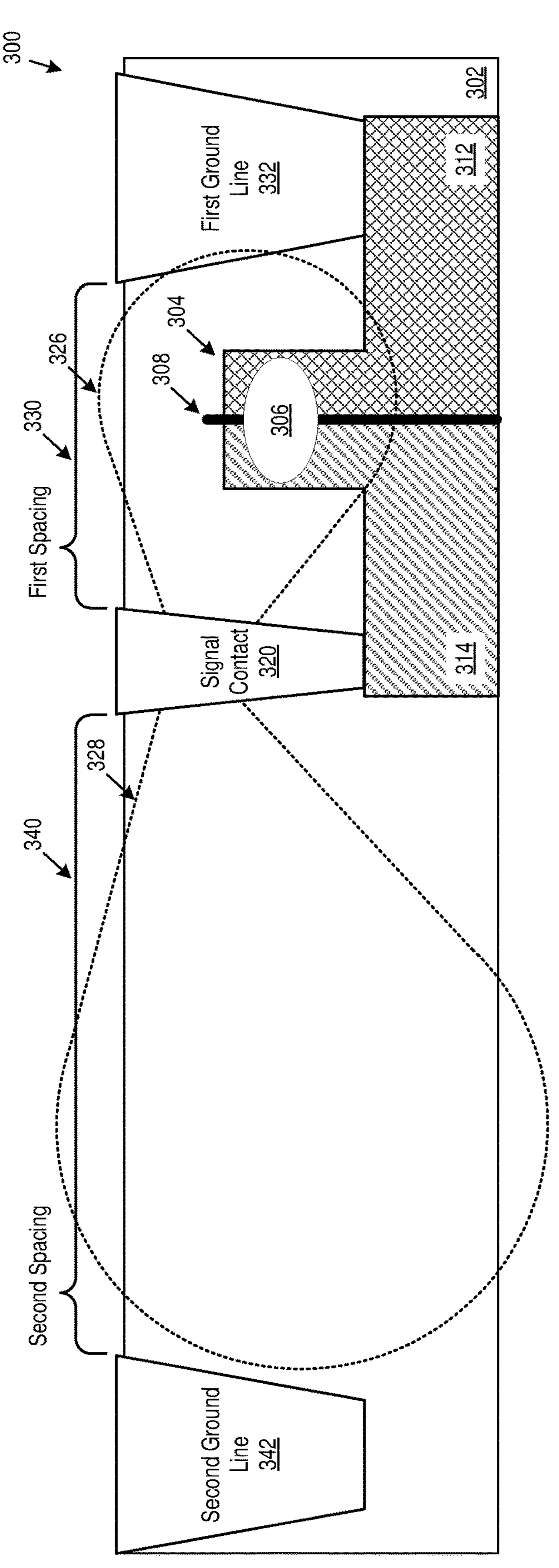
FIG. 3 shows a cross-sectional view of an example semiconductor based optical modulator, in accordance with another implementation of the present disclosure.

Referring now to FIG. 3, a cross-sectional view of an example semiconductor based optical modulator 300 is shown. The example optical modulator 300 includes a semiconductor substrate 302. An optical waveguide 304 is disposed on the substrate 302. The optical waveguide 304 is structured to guide light in one or more optical modes 306 on an optical path (going into the page). A first P-N junction 308 is coincident with the optical waveguide 304. The P-N junction 308 is aligned with the optical path. In the example modulator 300, the P-N junction 308 is aligned through the middle of the optical waveguide 304. The P-N junction 308 defines a border between the P-doped portion 312 on the substrate 302 and an N-doped portion 314 on the substrate 302.

When the P-N junction 308 is exposed to an electrical potential, the population of carriers along the P-N junction 308 changes, and as discussed above, an intrinsic region forms in the at the P-N junction 308 which changes the optical-domain refractive index of the optical path. When the electrical potential changes, the carrier population in the intrinsic region changes. When the population of carriers changes, the optical domain refractive index changes as well. In other words, a change in electrical potential results in a change in the optical-domain refractive index at the P-N junction 308. Accordingly, when exposed to an RF signal, refractive index of the P-N junction 308 is dependent on the changing E-field of the RF-signal. Because the one or more optical modes 306 straddle the P-N junction 308, any change in refractive index changes the dispersion of the optical waveguide 304 and changes the phase of the light at the exit of the optical waveguide 304. Further, because the optical-domain refractive index is controlled by the input RF-signal, the resultant phase shift for the optical mode 306 also is dependent on the RF signal. When recombined and interfered with the other split coherent light, the time-dependent intensity of the interfered modulated output light depends on the time-dependent intensity of the E-field of the RF-signal.

For clarity, light (e.g., optical domain signals) and/or any other oscillating electromagnetic field (including electrical domain signals) have multiple different wave velocities that are relevant to the speed at a which a signal travels in a medium (such as a waveguide, an extended electrical contact, and/or other propagation medium). For example, a signal has a phase velocity, which corresponds to the speed at which individual electromagnetic oscillations within the signal travel within the medium. For example, a signal has a group velocity which corresponds to the speed at which a waveform (such as a pulse) travels within the medium. A wave velocity has a corresponding index, which has an inverse relationship to the corresponding wave velocity. For example, a refractive index corresponds to the phase velocity while a group index corresponds to the group velocity.

The optical waveguide 304 is disposed within a first spacing 330 separating the signal contact 320 and the first ground line 332. A second spacing 340 is opposite the first spacing 330 and separates the signal contact 320 and a second ground line 342. The signal contact 320 extends alongside the optical waveguide 304. For example, in some straight waveguide modulators, such as a MZM modulator, the signal contact 320 is parallel to the optical waveguide 304.

When an electrical domain signal is provided to the signal contact 320, the electrical domain signal travels parallel to the optical waveguide 304 (e.g., transverse to the plane of the cross-sectional view of the optical modulator 300). The electrical-domain modes 326, 328 of the electrical domain signal spread out transverse to the direction of travel of the electrical domain signal. The direction of travel of the optical domain signal and the electrical domain signal is transverse to the cross-sectional view of FIG. 3. Thus, FIG. 3 shows a "transverse-to-signal-travel" cross-sectional view. These electrical-domain modes 326, 328 provide a changing E-field across the optical waveguide causing a time-dependent refractive index shift which can be used to modulate the optical domain signal as discussed above.

The ground lines 332, 342 have the effect of confining the electrical-domain modes 326, 328. In other words, the first spacing 330 and second spacing 340 between the ground lines 332, 342 and the signal contact 320 determine how large the electrical-domain modes 326 become. The first spacing 330 between the first ground line 332 and the signal contact 320 determines how much the portion electrical-domain modes 326 in the immediate vicinity of the optical waveguide 304 expand. The more that this portion of the electrical-domain modes 326 expand, the weaker the E-field strength incident on the optical waveguide 304 becomes. Thus, the longer the first spacing 330 becomes, the weaker the modulation signal becomes. Therefore, the length of first spacing 330 has an effect on the performance of the modulator 300. In various implementations, the first spacing 330 is selected based on obtaining the desired field strength across the optical waveguide portion 304.

The second spacing 340 controls how the electrical-domain modes 328 expand in the portion opposite to the first spacing 330 and away from the optical waveguide 304. Because the portions of the E-field that do not overlap with the optical waveguide 304 have a reduced effect on the performance of the modulator 300, the tightness of the confinement of the electrical-domain modes 328 that do not overlap with the optical waves have a limited effect on the performance of the modulator 300. Thus, changing the level of confinement provided by the second ground line 342 (which is governed by the second spacing 340) have a limited effect on the optical modulator's performance. Accordingly, the first spacing 330 is selected (at least in part) to achieve the desired field strength incident on the optical waveguide portion 304 by providing a determined level of confinement of the electrical-domain modes 326 in the vicinity of the optical waveguide 304. Because the second spacing 340 differs from the first spacing 330 in the asymmetric opposing ground line design, the second spacing 340 is (at least in part) a free parameter that is selected based on criteria other than a need to provide the determined level of confinement of the electrical-domain modes 326, 328.

For example in various implementations, the second spacing 340 is selected to provide a target level of impedance to effect wave velocity matching between electrical domain signals that travel along the signal contact 320 and optical domain signals that travel along the waveguide 304. Increasing the second spacing 340 increases impedance because the electrical domain mode 328 expands to cover more of the high-impedance substrate 102. Decreasing the second spacing 340 decreases impedance because the electrical domain mode 328 shrinks and covers less of the high-impedance substrate 102. In some implementations, the wave velocity matching includes matching a phase velocity of the electrical domain signal to a group velocity of the optical domain signals. In other words, the refractive index experienced by the electrical domain signal is matched to the group index experienced by the optical domain signal. In some cases, to achieve wave velocity matching, the refractive index for the electrical domain signal is increased (e.g., by reducing the phase velocity of the electrical domain signal) relative to what the refractive index would have been in a symmetric opposing ground line design. Thus, in an implementation, the second spacing 340 is made to be longer than the first spacing 330. Conversely, if wave velocity matching requires that the refractive index for the electrical domain signal is to be reduced relative what the refractive index that would have been in a symmetric opposing ground line design, the second spacing 340 is selected to be smaller than the first spacing 330.

In some cases, practical concerns (such as fabrication constraints on the smallest allowed contact cross-sections, and/or other real-world concerns) result in the impedance experienced by an electrical domain signal traveling along the signal contact 320 to be lower than the level that would achieve wave velocity matching. Thus, in many optical modulator systems, the second spacing is larger than the first spacing.

In various implementations, the electrical domain modes 326, 328 cover various cross-sectional regions of the semiconductor modulator 300. The materials contribute to the effective refractive index associated with the electrical domain modes 326, 328. In some implementations, the refractive index of electrical domain modes 326, 328 correspond at least in part, to contributions from various materials such as, silicon, the metal or other conductive material for the contacts and lines, silica, and/or other materials. In some implementations, the effective refractive index for the electrical domain modes 326, 328 is greater than 3.2.

In various implementations, the relative positioning of ground lines is combined with other impedance control schemes. For example, a "slow wave" signal contact configuration consistent with configurations seen in FIG. 1 is applied in some implementations. In some implementations, the transverse-to-signal-travel cross-section of the signal contact is sized to achieve a target contribution to impedance. For example, reducing the cross-sectional area of the signal contact increases the impedance of the signal contact. Accordingly, in some implementations, the transverse-to-signal-travel cross-sectional width of the signal contact 320 is selected to provide, at least in part, the target level of impedance for the optical modulator 300. For example, a 10 micron diameter signal contact for a metal contact is implemented, in some cases, to achieve a base level of impedance. In some cases, the diameter is selected from a range of diameters (and/or other cross-sectional dimensions). For example, a range of diameters from 5 to 15 microns allows for coverage of an array of RF use cases.

Figure 4:
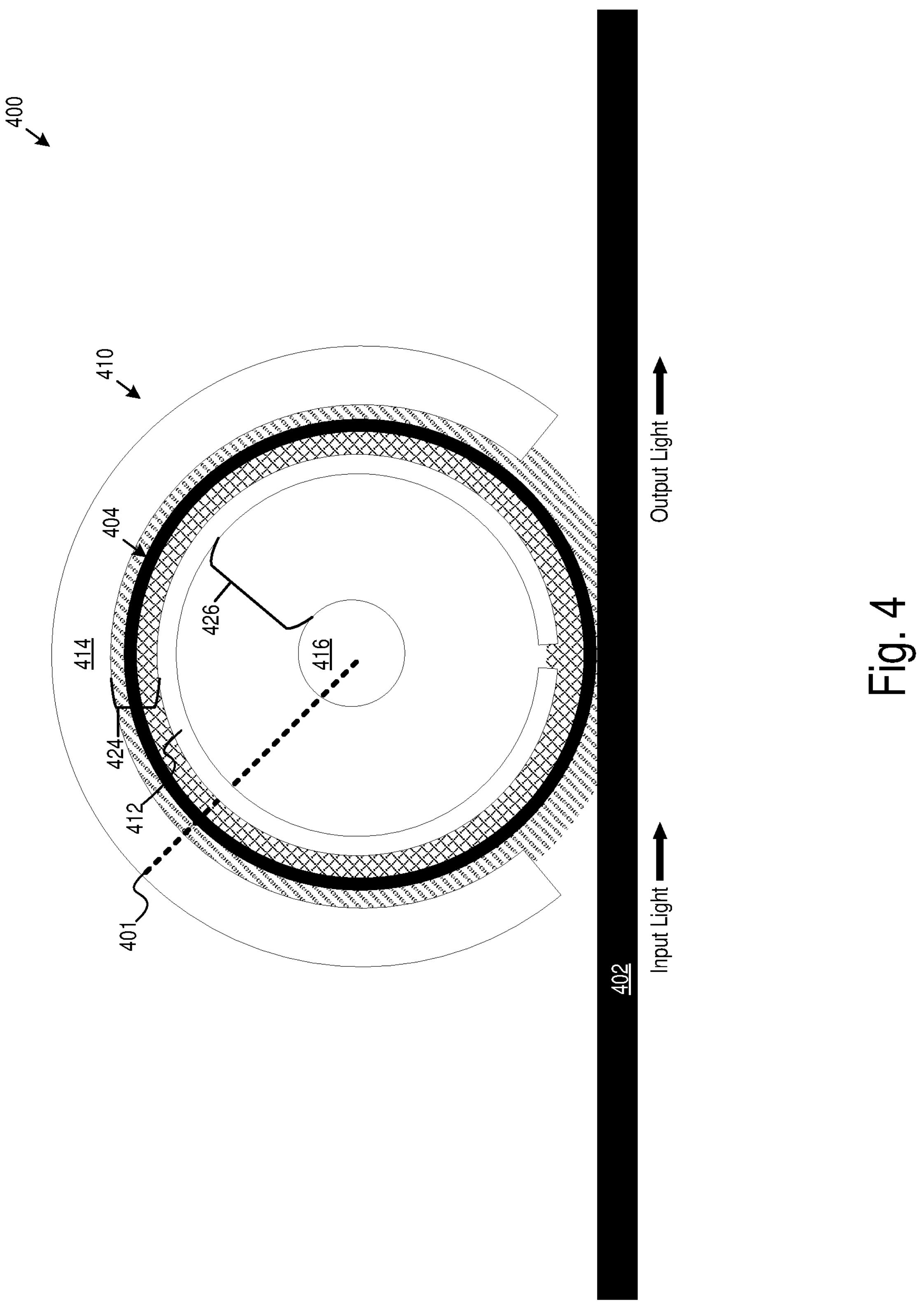
FIG. 4 shows an example ring modulator which may have the cross-section of FIG. 1 or FIG. 3.

FIG. 4 shows an example ring modulator 400. In the example, an input/output waveguide 402 is optically coupled to a resonator 410 forming a ring. The cross-sections of FIG. 1 and/or FIG. 3 corresponds to a radial cross-section of the resonator 410, e.g., at position 401. The signal contact 412 and an optical waveguide 404 form (at least portions of) concentric annular regions making up the resonator 410. One or both of the ground lines form concentric annular regions. In the example ring modulator 400, the first ground line 414 is a concentric annular region separated from the signal contact 412 by the first spacing 424. In the example ring modulator 400, the second ground line 416 is a circular lump separated from the signal contact 412 by the second spacing 426. Nevertheless, in various implementations, the first ground line includes a circular lump contact and/or the second ground line includes a concentric annular region. An electrical mode 439 expands radially across the resonator 410 outward from the signal contact 412. Light circulating in the optical waveguide 404 is phase-shifted in accordance with an electrical-domain signal traveling along the signal contact 412. The light circulating in the optical waveguide 404 interferes with light traveling in the input/output waveguide 402 because, in the example, the coupling is bi-directional.

Figure 5:
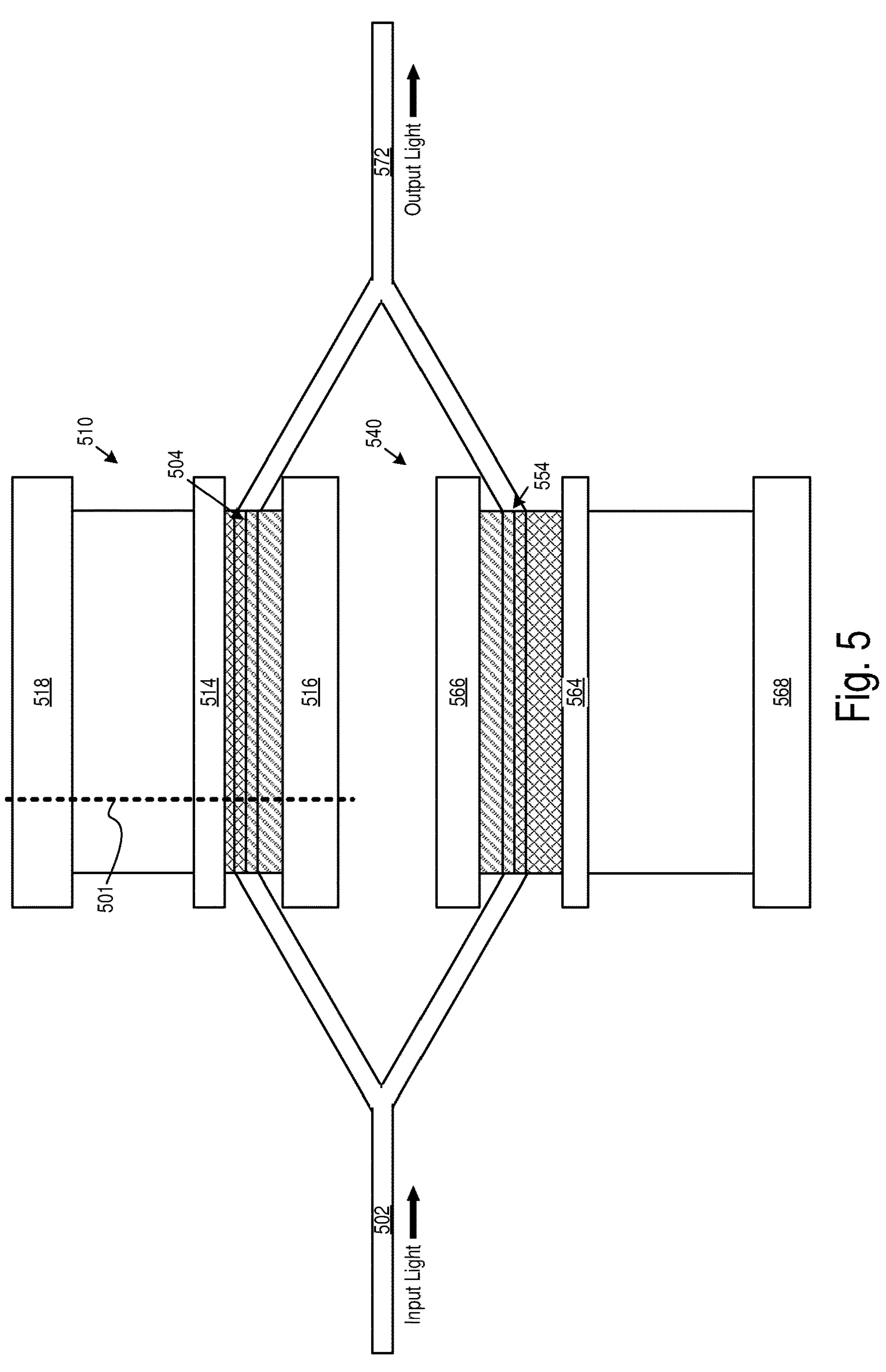
FIG. 5 shows an example Mach-Zehnder modulator which may have the cross-section of FIG. 1 or FIG. 3.

FIG. 5 shows a position 501 of the example cross-section of FIG. 1 or FIG. 3 as implemented in an example semiconductor based MZM 500. In the example semiconductor based MZM 500, light is guided into the MZM 500 from an input waveguide 502. The light is split into two arms 510, 540 for interference and recombination at an output waveguide 572. The cross-sections of FIG. 1 and/or FIG. 3 correspond to cross sections of one or both of the arms 510, 540 of the example MZM 500 (e.g., at position 501). The optical waveguides 504, 554, signal contacts 514, 564, and ground lines 516, 566, 518, 568 extend along the arms 510, 540 of the MZM 500. For example, light on the first arm 510 undergoes a phase shift and then interferes with un-shifted light of the second arm 540 resulting in intensity modulation of recombined light at the output waveguide 572. In an example, light traveling on both arms 510, 540 is imparted with opposite phase shifts by applying the modulation signal additional along signal contact 564 (e.g., mirroring the physical layout of the arms 510, 540 such that the relative index shift is reversed with respect to the direction of travel of the optical mode). Accordingly, the degree of relative phase shift in the arms is doubled (e.g., a 90 degree phase shift on one arm corresponds to a 180 degree relative phase shift between the light in the respective arms 510, 540).

Although not shown, in various implementations, the arms 510, 540 may share a ground line. The shared ground line may serve as a first ground line in both arms, a second ground line in both arms, or a second ground line in one arm while serving as a first ground line in the other arm. As discussed above, the optical waveguide may be disposed between a signal contact and a first ground line. The signal contact is disposed between the first ground line and a second ground line. Thus, a ground-signal-ground-signal-ground (GSGSG) contact configuration, may be used to implement a MZM modulator. The two signal contacts in the GSGSG contact configuration are used to implement the two arms of the MZM modulator. The ground line between the two signal contacts is shared by the two arms of the MZM modulator.

Figure 6:
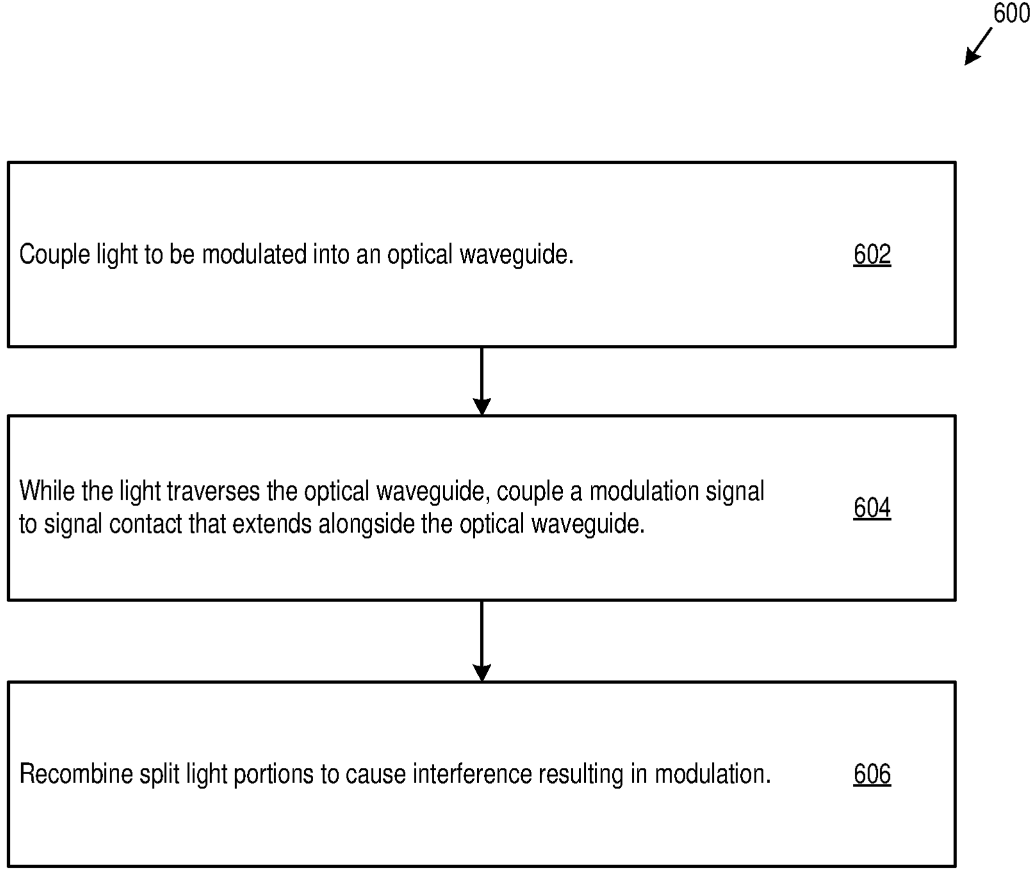
FIG. 6 shows an example method of operation for the example semiconductor the based optical modulators of FIG. 4 and/or FIG. 5.

FIG. 6 shows an example method of operation 600 for an example semiconductor based optical modulator. The method of operation 600 is implemented by any of the example optical modulators discussed above with reference to FIGS. 1, and 3-5, or another suitable optical modulator.

Light to be modulated is optically coupled into an optical waveguide (602). In various implementations, an illumination source, such as a continuous wave laser tuned to a communication band or coherent illumination source, provides the light to be modulated. In various implementations, the coupling of the light into the optical waveguide includes splitting the provided coherent illumination (e.g., by coupling into a resonator (such as the resonator 410 of the example ring modulator 400 of FIG. 4) or an arm of an MZM (such as the arm 510 or the arm 540 of the MZM 500 of FIG. 5).

While the light traverses the optical waveguide, a modulation signal is provided to a signal contact (604). The signal contact is disposed between two opposing ground lines in an asymmetric spacing configuration. The modulation signal (such as an RF signal) causes charge carriers at a P-N junction to change in population in response to the modulation signal. Due to the plasma-dispersion effect, the changing population of carriers causes the optical-domain refractive index in the optical waveguide to shift. The optical-domain refractive index shift in the optical waveguide causes a relative phase shift in the light as the light traverses the optical waveguide.

After traversing the optical waveguide, the split portions of the light are recombined (606) to cause interference that results in the output light having intensity profile that is dependent on the modulation signal.

Figure 7:
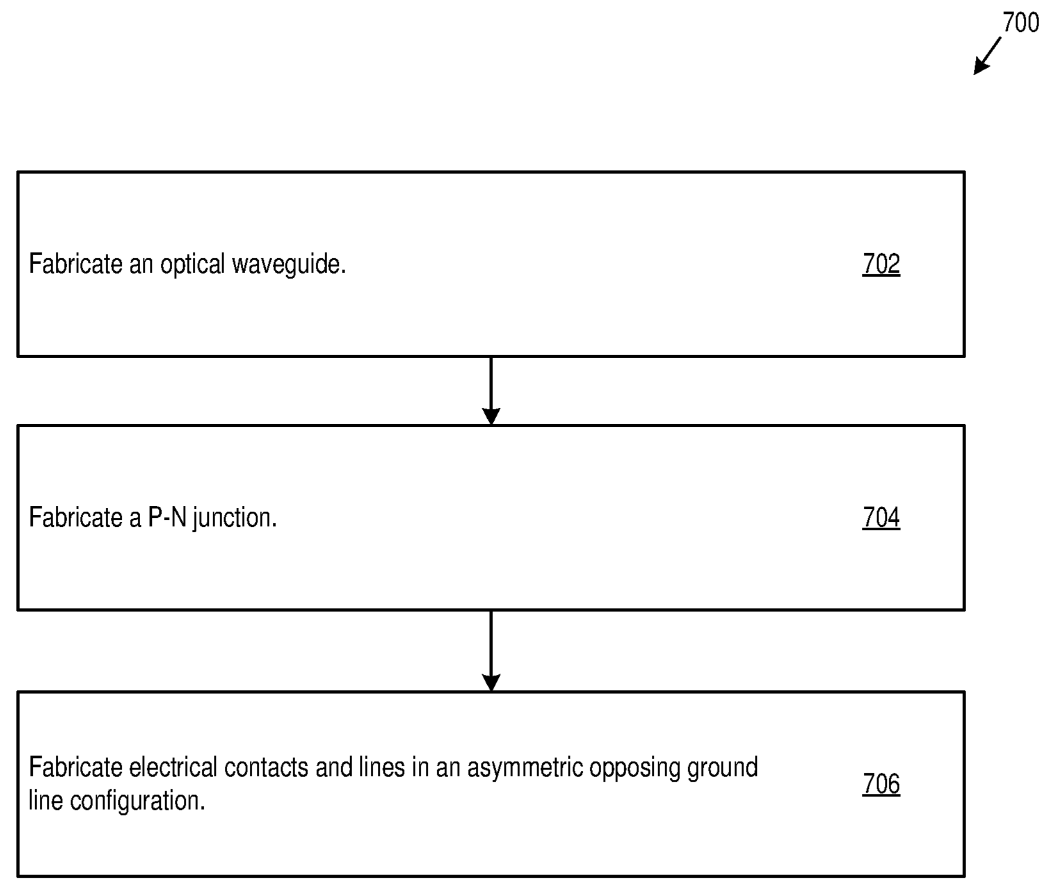
FIG. 7 shows an example method of manufacture for the example semiconductor the based optical modulators of FIG. 4 and/or FIG. 5

FIG. 7 shows an example method of manufacture 700 for an example semiconductor based optical modulator. The method of manufacture 700 is implemented to manufacture any of the example optical modulators discussed above with reference to FIGS. 1, and 3-5, or another suitable optical modulator. In other examples, any of the example optical modulators discussed above with reference to FIGS. 1, 3-5 are manufactured according to another suitable method of manufacture different than the method of manufacture 700.

An optical waveguide is fabricated on a semiconductor substrate (702), such as a silicon photonics substrate. In various implementations, the optical waveguide includes a region of high refractive index surrounded by lower refractive index material. For example, the waveguide includes a raised channel or ridge of comparatively higher optical-domain refractive index material (such as silicon, doped silicon, or other comparatively higher optical-domain refractive index material) surrounded on one or more sides by a material of comparatively lower optical-domain refractive index material (e.g., such as air, silicon dioxide, or other comparatively lower optical-domain refractive index material).

A P-N junction is fabricated on the semiconductor substrate (704). In various implementations, the fabrication of the P-N junction includes fabrication of P-doped portion and N-doped portion on the substrate with P-N junctions defining the borders between the P-doped portion and the N-doped portion.

In some cases, the P-doped portions and the N-doped portions are fabricated prior to fabrication of the waveguide. For example, in some cases, the P-doped portion and the N-doped portion are fabricated by applying a mask, diffusing a first one of the P-dopants and the N-dopants into the masked substrate, removing the mask and applying a compliment mask, and diffusing the other of the P-dopants and the N-dopants into the complimentarily masked substrate, removing the compliment mask, applying a mask over the optical waveguide, and etching the substrate around the waveguide to form a raised ridge. However, other implementations use other suitable fabrication techniques. For example, in some cases, either or both of the P-dopants and the N-dopants are diffused in multiple cycles of masking and diffusion to create sub-portions with differing dopant levels.

Electrical contacts and lines are fabricated on the substrate (706). In various implementations, metal contacts are added to support application of the modulation signal for travelling wave operation, in which the modulation signal is allowed to propagate along an extended length of the signal contact. In some cases, the metal contacts and lines are applied in multiple layers. For example, in some cases, vias are formed to provide electrical contact to the optical waveguide in a first layer of the substrate. The first layer of the substrate is then covered in an intermediate layer (such as an oxide layer). The vias extend through the intermediate layer to connect with metal contacts fabricated on top of the intermediate layer. Thus, the signal contact and first ground line may be electrically-coupled to the optical waveguide using one or more vias.

Various example implementations have been included for illustration. Other implementations are possible.

Table 1 includes various examples.

TABLE 1

| Examples |
|---|
| E1. An optical modulator, including:<br>a semiconductor substrate;<br>an optical waveguide portion disposed on the semiconductor substrate, the optical waveguide portion configured to provide an optical path for light that is to be modulated;<br>a signal contact disposed on the semiconductor substrate, the signal contact extending parallel to the optical path;<br>a first ground line disposed on the semiconductor substrate spaced a first distance away from the signal contact, the optical waveguide portion disposed between the signal contact and the first ground line; and<br>a second ground line disposed on the semiconductor substrate spaced a second distance away from the signal contact, the first distance different from the second distance, the signal contact disposed between the optical waveguide portion and the second ground line. |
| E2. The optical modulator of any other example in this table, where the second distance is greater than the first distance. |
| E3. The optical modulator of any other example in this table, wherein:<br>the optical modulator is structured as a ring modulator including a resonator portion forming a ring; and<br>the optical waveguide portion and the signal contact include at least parts of concentric annular regions of the resonator portion. |

TABLE 1-continued

| Examples |
| --- |
| E4. The optical modulator of any other example in this table, wherein a N-doped portion and a P-doped portion of the optical waveguide portion are configured to undergo a shift in refractive index relative to one another responsive to a travelling electrical domain signal on the signal contact. |
| E5. The optical modulator of any other example in this table, wherein the signal contact, the first ground line, and/or the second ground line include a metal contact. |
| E6. The optical modulator of any other example in this table, wherein the second distance is selected to achieve wave velocity matching between a travelling electrical-domain signal on the signal contact and the light that is to be modulated. |
| E7. The optical modulator of any other example in this table, wherein the second distance is selected to provide, at least in part, a target impedance for a travelling electrical-domain signal on the signal contact. |
| E8. The optical modulator of example E7 or any other example in this table, wherein a width of a transverse-to-signal-travel cross-section is selected to provide the target impedance for the travelling electrical-domain signal in combination with the second distance. |
| E9. The optical modulator of example E8 or any other example in this table, wherein the width of the transverse-to-signal-travel cross-section is between 5 microns and 15 microns. |
| E10. The optical modulator of any other example in this table, wherein an electrical-domain refractive index associated with travel along the signal contact is 3.2 or greater. |
| E11. The optical modulator of any other example in this table, wherein:<br>the optical waveguide portion is disposed on the semiconductor substrate within a first layer; and<br>the signal contact is disposed on the semiconductor substrate within a second layer deposited on top of the first layer. |
| E12. The optical modulator of example E11 or any other example in this table, wherein the first ground line and second ground line are disposed on the semiconductor substrate within the second layer. |
| E13. The optical modulator of example E12 or any other example in this table, wherein the signal contact and the first ground line are electrically coupled to the optical waveguide portion using one or more vias. |
| E14. The optical modulator of any other example in this table, wherein:<br>the optical modulator includes a Mach-Zehnder modulator;<br>the optical waveguide portion and signal contact form at least part of a first arm of the Mach-Zehnder modulator; and<br>the Mach-Zehnder modulator includes a second arm including another optical waveguide portion and another signal contact. |
| E15. An optical modulator, including:<br>a semiconductor substrate;<br>an optical waveguide portion disposed on the semiconductor substrate, the optical waveguide portion configured to provide an optical path for light that is to be modulated;<br>a travelling-wave signal contact disposed on the semiconductor substrate;<br>a first ground line disposed on the semiconductor substrate spaced a first distance away from the travelling-wave signal contact; and<br>a second ground line disposed on the semiconductor substrate, opposite the first ground line, a second distance away from the travelling-wave signal contact, the first distance different from the second distance, the second distance selected to achieve wave velocity matching between an electrical-domain signal on the travelling-wave signal contact and the light that is to be modulated. |
| E16. The optical modulator of any other example in this table, wherein the wave velocity matching includes matching a phase velocity of the electrical-domain signal with a group velocity of the light that is to be modulated. |
| E17. The optical modulator of any other example in this table, wherein the travelling-wave signal contact extends parallel to the optical path such that the light to be modulated travels parallel to a direct of travel of the electrical-domain signal. |
| E18. A method, including:<br>optically coupling light to be modulated onto an optical path provided by an optical waveguide portion disposed on a semiconductor substrate; and<br>performing wave velocity matching between the light and a travelling electrical domain signal by:<br>electrically coupling the travelling electrical domain signal across a first spacing from a signal contact disposed on the semiconductor substrate to a first ground line disposed on the semiconductor substrate, the signal contact extending parallel to the optical path, the first spacing extending a first distance; and<br>electrically coupling the travelling electrical domain signal across a second spacing from the signal contact to a second ground line disposed on the semiconductor substrate, the second spacing extending a second distance away from the signal contact opposite the first spacing, the first distance different from the second distance. |
| E19. The method of any other example in this table, wherein electrically coupling the travelling electrical domain signal across the first spacing includes electrically coupling the travelling electrical domain signal across the optical waveguide portion transverse to the optical path. |
| E20. The method of any other example in this table, wherein electrically coupling the travelling electrical domain signal across the first spacing includes electrically coupling the travelling electrical domain signal transverse to a direction of travel along the signal contact. |

TABLE 1-continued

| Examples |
| --- |
| E21. An optical modulator, including:<br>a semiconductor substrate;<br>an optical waveguide portion disposed on the semiconductor substrate, the optical waveguide portion configured to provide an optical path for light that is to be modulated;<br>a travelling-wave signal contact disposed on the semiconductor substrate;<br>a first ground line disposed on the semiconductor substrate spaced a first distance away from the travelling-wave signal contact, the optical waveguide portion disposed between the travelling-wave signal contact and the first ground line; and<br>a second ground line disposed on the semiconductor substrate spaced a second distance away from the travelling-wave signal contact, the first distance different from the second distance, the travelling-wave signal contact disposed between the optical waveguide portion and the second ground line. |
| E22. A method of manufacture, including:<br>providing semiconductor substrate;<br>fabricating an optical waveguide portion disposed on the semiconductor substrate, the optical waveguide portion configured to provide an optical path for light that is to be modulated;<br>fabricating a travelling-wave signal contact disposed on the semiconductor substrate;<br>fabricating a first ground line disposed on the semiconductor substrate spaced a first distance away from the travelling-wave signal contact, the optical waveguide portion disposed between the travelling-wave signal contact and the first ground line; and<br>fabricating a second ground line disposed on the semiconductor substrate spaced a second distance away from the travelling-wave signal contact, the first distance different from the second distance, the travelling-wave signal contact disposed between the optical waveguide portion and the second ground line. |
| E23. The method of fabrication of an optical modulator of any example in this table, where:<br>fabricating the optical modulator includes fabricating a ring modulator including a resonator forming a ring; and<br>fabricating the resonator includes fabricating concentric annular regions forming the optical waveguide portion and the signal contact. |
| E24. The method of fabrication of an optical modulator of any example in this table, where:<br>fabricating the optical modulator includes fabricating a Mach-Zehnder modulator; and<br>fabricating an arm of the Mach-Zehnder modulator includes fabricating the optical waveguide portion and the signal contact. |
| E25. A method of optical modulation including implementing the optical modulator of any example in this table. |
| E26. A method of manufacture including fabricating the optical modulator of any example in this table. |
| E27. The optical modulator of any example in this table, wherein:<br>the first ground line and second ground line are asymmetrically positioned alongside the signal contact within a first arm of a Mach-Zehnder modulator; and<br>the Mach-Zehnder modulator includes a second arm including another signal contact asymmetrically positioned between two second-arm ground lines. |
| E28. The optical modulator of any example in this table, wherein:<br>two second-arm ground lines include the first ground line as a shared ground line. |

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only.

What is claimed is:

1. An optical modulator, including:

a semiconductor substrate;

an optical waveguide portion disposed on the semiconductor substrate, the optical waveguide portion configured to provide an optical path for light that is to be modulated;

a signal contact disposed on the semiconductor substrate, the signal contact extending alongside the optical path;

a first ground line disposed on the semiconductor substrate and spaced a first distance away from the signal contact, the optical waveguide portion disposed between the signal contact and the first ground line, the first distance selected based on a desired field strength across the optical waveguide portion; and a second ground line disposed on the semiconductor substrate spaced a second distance away from the signal contact, the first distance different from the second distance, the signal contact disposed between the optical waveguide portion and the second ground line, the second distance selected to be longer than the first distance based on a target impedance for a travelling electrical-domain signal.

2. The optical modulator of claim 1, wherein an electrical-domain refractive index associated with travel along the signal contact is 3.2 or greater.

3. The optical modulator of claim 1, wherein the optical waveguide portion is configured to undergo an optical domain refractive index shift responsive to a travelling electrical domain signal on the signal contact.

4. The optical modulator of claim 1, wherein the second ground line is configured to cause a match of wave velocities between a travelling electrical-domain signal on the signal contact and the light that is to be modulated on the optical path.

5. The optical modulator of claim 1, wherein a width of a transverse-to-signal-travel cross-section of the signal contact provides the target impedance for the travelling electrical-domain signal in combination with the second distance.

6. The optical modulator of claim 5, wherein the width of the transverse-to-signal-travel cross-section of the signal contact is between 5 microns and 15 microns.

7. The optical modulator of claim 1, wherein:

the optical waveguide portion is disposed within a first layer of the semiconductor substrate; and the signal contact is disposed on the semiconductor substrate within an intermediate layer deposited on top of the first layer.

8. The optical modulator of claim 7, wherein the first ground line and second ground line are disposed on the semiconductor substrate within the second layer.

9. The optical modulator of claim 8, wherein the signal contact and the first ground line are electrically coupled to the optical waveguide portion using one or more vias.

10. The optical modulator of claim 1, wherein:

the first ground line and second ground line are asymmetrically positioned alongside the signal contact within a first arm of a Mach-Zehnder modulator; and the Mach-Zehnder modulator includes a second arm including another signal contact asymmetrically positioned between two second-arm ground lines.

11. The optical modulator of claim 10, wherein:

two second-arm ground lines include the first ground line as a shared ground line.

12. The optical modulator of claim 1, wherein:

the second ground line is disposed on the semiconductor substrate opposite the first ground line, the second distance selected to be longer than the first distance to match respective wave velocities of an electrical-domain signal provided to the signal contact and the light that is to be modulated on the optical path.

13. The optical modulator of claim 12, wherein the second distance is positioned such that the signal contact has a target impedance for a travelling electrical-domain signal based at least in part on the second distance.

14. The optical modulator of claim 12, wherein the second ground line is configured to cause a match of a phase velocity of the electrical-domain signal with a group velocity of the light that is to be modulated based at least in part on the second distance.

15. The optical modulator of claim 12, wherein the signal contact extends parallel to the optical path such that the light to be modulated travels parallel to a direction of travel of the electrical-domain signal.

* * * * *